(12) United States Patent
Xie et al.

(10) Patent No.: US 12,334,845 B2
(45) Date of Patent: Jun. 17, 2025

(54) POWER TOOL

(71) Applicant: Nanjing Chervon Industry Co., Ltd., Nanjing (CN)

(72) Inventors: Aihua Xie, Nanjing (CN); Yanqing Xu, Nanjing (CN); Guang Li, Nanjing (CN); Shuang Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 151 days.

(21) Appl. No.: 18/189,507

(22) Filed: Mar. 24, 2023

(65) Prior Publication Data

US 2023/0231503 A1 Jul. 20, 2023

Related U.S. Application Data

(63) Continuation of application No. PCT/CN2021/119601, filed on Sep. 22, 2021.

(30) Foreign Application Priority Data

Oct. 20, 2020 (CN) .......................... 202011121013.6
Oct. 20, 2020 (CN) .......................... 202011122569.7

(51) Int. Cl.
*H02P 21/22* (2016.01)
*H02P 21/18* (2016.01)
*H02P 27/08* (2006.01)

(52) U.S. Cl.
CPC .............. *H02P 21/22* (2016.02); *H02P 21/18* (2016.02); *H02P 27/085* (2013.01)

(58) Field of Classification Search
CPC ........... H02P 21/22; H02P 21/18; H02P 27/08
(Continued)

(56) References Cited

U.S. PATENT DOCUMENTS

2011/0309781 A1* 12/2011 Tomigashi .............. H02P 21/14
318/504
2014/0176028 A1* 6/2014 Tobari ..................... B60L 3/003
318/400.15
(Continued)

FOREIGN PATENT DOCUMENTS

CN 101252336 A 8/2008
CN 101615876 A 12/2009
(Continued)

OTHER PUBLICATIONS

Xu et al. (CN 111756307 A) Electric Tool Date Published Oct. 9, 2020 (Year: 2020).*
(Continued)

*Primary Examiner* — Jorge L Carrasquillo
(74) *Attorney, Agent, or Firm* — Greenberg Traurig, LLP (57) ABSTRACT

A power tool includes a motor, a speed regulation mechanism, a driver circuit, and a control module. The motor includes a stator winding and a rotor. The speed regulation mechanism is at least used for setting a target rotational speed of the motor. The driver circuit is used for delivering electrical energy provided by a power supply device from a direct current bus to the motor, where the driver circuit includes multiple electronic switches connected between the power supply device and the motor. The control module is configured to calculate a voltage vector according to a measured rotational speed of the motor, a phase current of the stator winding, and the target rotational speed and overmodulate the voltage vector to output a pulse-width
(Continued)

modulation (PWM) signal to the driver circuit. A per-unit value of an amplitude of the voltage vector ranges from 0 to 1.15.

13 Claims, 10 Drawing Sheets

(58) Field of Classification Search
USPC .......................................................... 318/432
See application file for complete search history.

(56) References Cited

U.S. PATENT DOCUMENTS

| 2017/0047871 | A1* | 2/2017 | Maiocchi | .............. | H02M 5/458 |
| 2018/0083565 | A1* | 3/2018 | Saha | ......................... | H02P 6/14 |

FOREIGN PATENT DOCUMENTS

| CN | 105978439 | B | 10/2018 |
| CN | 109873578 | A | 6/2019 |
| CN | 110601638 | A | 12/2019 |
| CN | 111756307 | A | 10/2020 |
| WO | 2020017202 | A1 | 1/2020 |

OTHER PUBLICATIONS

Liu et al. (CN 101252336 A)Permanent Magnet Synchronous Motor-compressor System High-speed Operation Control Method Date Published Dec. 28, 2011 (Year: 2011).*
Cerro et al. (CN 103095168 A)Voltage Source Converter With Neutral Point Clamping Topology and Operation Method Thereof Date Published May 8, 2013 (Year: 2013).*
Li et al. (CN 109873578 B)Electric Tool and Control Method of Electric Tool Date Published Jun. 11, 2019 (Year: 2019).*
Han et al. (CN 101615876 B) A Speed Control System and Method of Non-salient Pole Permanent Magnet Synchronous Motor Date Published Jul. 27, 2011 (Year: 2011).*
ISA/CN, Int. Search Report issued on PCT application No. PCT/CN2021/119601, dated Dec. 22, 2021, 3 pages.
ISA/CN, English translation of Int. Search Report issued on PCT application No. PCT/CN2021/119601, dated Dec. 22, 2021, 3 pages.
ISA/CN, Written Opinion issued on PCT application No. PCT/CN2021/119601, dated Dec. 22, 2021, 4 pages.
ISA/CN, English translation of Written Opinion issued on PCT application No. PCT/CN2021/119601, dated Dec. 22, 2021, 3 pages.
Extended European Search Report from European application No. 21881803.7, dated Jan. 30, 2024, 8 pp.

* cited by examiner

POWER TOOL

RELATED APPLICATION INFORMATION

This application is a continuation of International Application Number PCT/CN2021/119601, filed on Sep. 22, 2021, through which this application also claims the benefit under 35 U.S.C. § 119(a) of Chinese Patent Application No. 202011122569.7, filed on Oct. 20, 2020, and Chinese Patent Application No. 202011121013.6, filed on Oct. 20, 2020, which applications are incorporated herein by reference in their entirety.

BACKGROUND

A power tool in the related art generally uses a conventional square wave to drive a motor in the power tool, and a speed and torque of the motor are controlled through the adjustment of a duty cycle of a square wave signal.

When a direct current motor uses a conventional square wave modulation control manner, in an electrical cycle, the motor has only six states, that is to say, a stator current has six states (a three-phase bridge arm has six switching states). Each current state may be regarded as a resultant vector of torque in one direction, and six vectors are regularly switched step by step so that a rotor is driven to rotate, and the rotor of the motor rotates synchronously. The conventional square wave control is easy to implement, but only six discrete and discontinuous vectors of torque exist, resulting in the low output power, low motor efficiency, low energy utilization rate, and poor output performance of the power tool.

SUMMARY

A power tool includes a motor, a speed regulation mechanism, a driver circuit, and a control module. The motor includes a stator winding and a rotor rotating around a stator. The speed regulation mechanism is at least used for setting a target rotational speed of the motor. The driver circuit is used for delivering electrical energy provided by a power supply device from a direct current bus to the motor, where the driver circuit includes multiple electronic switches connected between the power supply device and the motor. The control module is configured to calculate a voltage vector according to a measured rotational speed of the motor, a phase current of the stator winding, and the target rotational speed and overmodulate the voltage vector to output a pulse-width modulation (PWM) signal to the driver circuit. A per-unit value of an amplitude of the voltage vector ranges from 0 to 1.15.

In one example, the power tool further includes a rotational speed detection module and a current detection module. The rotational speed detection module is used for detecting the measured rotational speed of the motor or/and a position of the rotor. The current detection module is used for detecting a phase current of each phase of stator winding.

In one example, the control module includes a first rotational speed loop for generating a target current of the motor according to the target rotational speed of the motor and an actual rotational speed of the motor.

In one example, the control module includes a current distribution unit, a current conversion unit, a first current loop, a second current loop, a voltage conversion unit, an overmodulation unit, and a control signal unit. The current distribution unit is used for distributing a direct-axis target current and a quadrature-axis target current according to the target current of the motor generated by the first rotational speed loop. The current conversion unit is used for generating a direct-axis actual current and a quadrature-axis actual current according to an actual current of the motor. The first current loop is used for generating a first regulation voltage according to the direct-axis target current and the direct-axis actual current. The second current loop is used for generating a second regulation voltage according to the quadrature-axis target current and the quadrature-axis actual current. The voltage conversion unit is used for generating a first voltage control quantity and a second voltage control quantity according to the first regulation voltage and the second regulation voltage. The overmodulation unit is used for performing overmodulation according to the first voltage control quantity and the second voltage control quantity to output a first overmodulated voltage and a second overmodulated voltage. The control signal unit is used for generating control signals according to the first overmodulated voltage and the second overmodulated voltage, where the control signals are used for controlling switching operations of the multiple electronic switches of the driver circuit.

In one example, the current detection module is configured to acquire internal resistance of an electronic switch turned on and calculate a bus current or the phase current according to a change of the internal resistance of the electronic switch.

In one example, the power tool further includes a detection resistor connected in series between the driver circuit and the winding; where the current detection module is configured to calculate a bus current or the phase current according to a voltage across the detection resistor.

In one example, the motor is a three-phase motor, and three-phase input voltages of the motor are at a phase angle of 120° to each other.

In one example, the PWM signal is a discontinuous PWM signal.

In one example, the power tool further includes a temperature detection module for detecting a temperature of the power tool before the motor is started; and the control module is configured to, when the temperature is lower than a first temperature threshold, overmodulate the voltage vector to obtain the modulated voltage vector to output a first PWM signal to the driver circuit so that the driver circuit drives the motor to start.

In one example, the control module is configured to, when the temperature is higher than a second temperature threshold, perform common modulation on the voltage vector to obtain the modulated voltage vector to output a second PWM signal to the driver circuit so that the driver circuit drives the motor to start.

In one example, the first temperature threshold is less than the second temperature threshold.

A power tool includes a motor, a speed regulation mechanism, and a control module.

The motor includes a stator winding and a rotor rotating around a stator. The speed regulation mechanism is at least used for setting a target rotational speed of the motor. The control module is configured to calculate a voltage vector according to a measured rotational speed of the motor, a phase current of the winding, and the target rotational speed and overmodulate the voltage vector to output a PWM signal to a driver circuit to maintain a phase voltage of the motor at a constant value for a preset time in one control cycle.

A power tool includes a motor, a speed regulation mechanism, and a control module.

The motor includes a stator winding and a rotor rotating around a stator. The speed regulation mechanism is at least used for setting a target rotational speed of the motor. The control module is configured to calculate a voltage vector according to a measured rotational speed of the motor, a phase current of the winding, and the target rotational speed and overmodulate the voltage vector to output a PWM signal to a driver circuit so that a voltage waveform of a filtered terminal voltage of the motor includes at least two peaks in one cycle.

A power tool includes a housing, a motor, a driver circuit, and a control module. The motor is disposed in the housing and includes a stator winding and a rotor rotating around the stator winding. The driver circuit is used for delivering electrical energy provided by a power supply device from a direct current bus to the motor, where the driver circuit includes multiple electronic switches connected between the power supply device and the motor. The control module is configured to control switching operations of the multiple electronic switches at a preset frequency to adjust a current loaded to the winding to rotate the motor at a preset rotational speed, where the preset frequency ranges from 5 kHz to 40 kHz.

In one example, the preset frequency ranges from 5 kHz to 20 kHz.

In one example, the control module is configured to set a pulse-width adjustment duty cycle of the driver circuit according to a target rotational speed of the motor.

A power tool includes a housing, a motor, a driver circuit, and a control module. The motor is disposed in the housing and includes a stator and a rotor rotating around the stator. The driver circuit is used for delivering electrical energy provided by a power supply device from a direct current bus to the motor, where the driver circuit includes multiple electronic switches connected between a power supply and the motor. The control module is configured to set a PWM signal having a preset frequency according to a target rotational speed of the motor to control switching operations of the multiple electronic switches, where the preset frequency ranges from 5 kHz to 40 kHz.

DETAILED DESCRIPTION

The present application is described below in detail in conjunction with drawings and examples.

A power tool in the present application may be a hand-held power tool, a garden tool, or a garden vehicle such as a vehicle-type lawn mower, which is not limited herein. The power tool in the present application includes, but is not limited to, a power tool that requires speed regulation, such as a screwdriver, an electric drill, a wrench, and an angle grinder, a sander and another power tool that may be used for grinding workpieces, a reciprocating saw, a circular saw, a jigsaw and the like that may be used for cutting workpieces, and an electric hammer and another power tool that may be used for impact. These tools may also be garden tools, such as a pruner, a chain saw, or a vehicle-type lawn mower. Additionally, these tools such as a blender may also be used for other purposes. As long as these power tools can adopt the essence of the technical solutions disclosed below, these power tools are within the scope of the present application.

Figure 1:
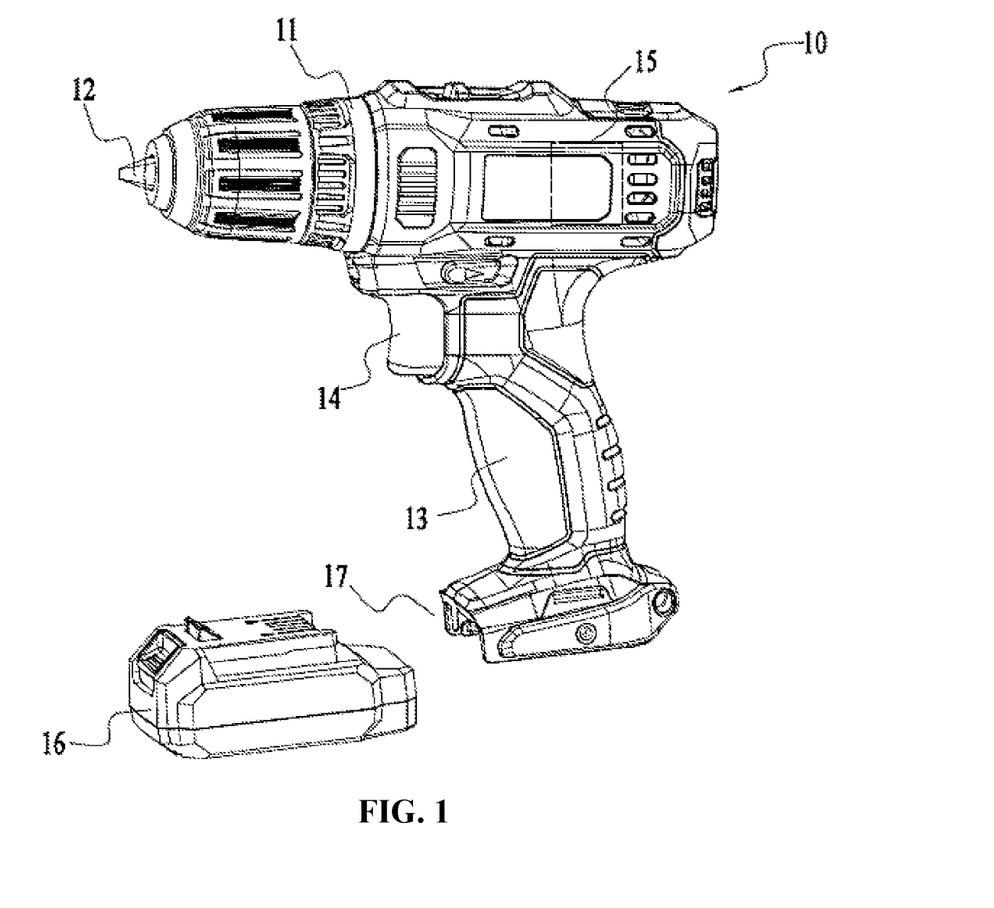
FIG. 1 is a structural view of a power tool according to an example.

Referring to FIG. 1, a power tool 10 is an electric drill. The power tool 10 includes a housing 11, a functional piece 12, a grip 13, a speed regulation mechanism 14, a motor 15, and a power supply device 16.

The housing 11 constitutes a body portion of the power tool and forms an accommodation space for accommodating the motor 15, a transmission mechanism, and other electronic components such as a circuit board. The motor 15 is used for converting electrical energy into power transmitted to the functional piece 12. The housing 11 is further formed with the grip 13 for a user to hold. A front end of the housing 11 is used for mounting the functional piece 12.

The functional piece 12 is used for implementing a function of the power tool 10, and the functional piece 12 is driven by the motor 15 to operate. Specifically, the functional piece 12 is driven by the motor 15 through an output shaft and the transmission mechanism. Different power tools have different functional pieces. As for the electric drill, the functional piece 12 is a drill bit (not shown) and used for implementing a drilling function.

The power supply device 16 is used for supplying electrical energy to the power tool 10. In this example, a battery pack is used for supplying power to the power tool 10. The power tool 10 includes a tool mating portion 17 through which the battery pack is connected to the power tool. The above is merely illustrative and does not limit the present application. In other examples, the power supply device may be an alternating current power supply, that is, the alternating current power supply is used for supplying power to the power tool, the alternating current power supply is alternating current mains power of 120 V or 220 V, and the power supply device includes a power supply conversion unit that is connected to an alternating current and used for converting the alternating current into a direct current usable by the power tool.

The speed regulation mechanism 14 is at least used for setting a target rotational speed of the motor 15, that is to say, the speed regulation mechanism 14 is used for speed regulation of the motor 15. The speed regulation mechanism 14 may be, but is not limited to, a trigger, a knob, or the like. In this example, the speed regulation mechanism 14 is configured to be a trigger structure.

Figure 2:
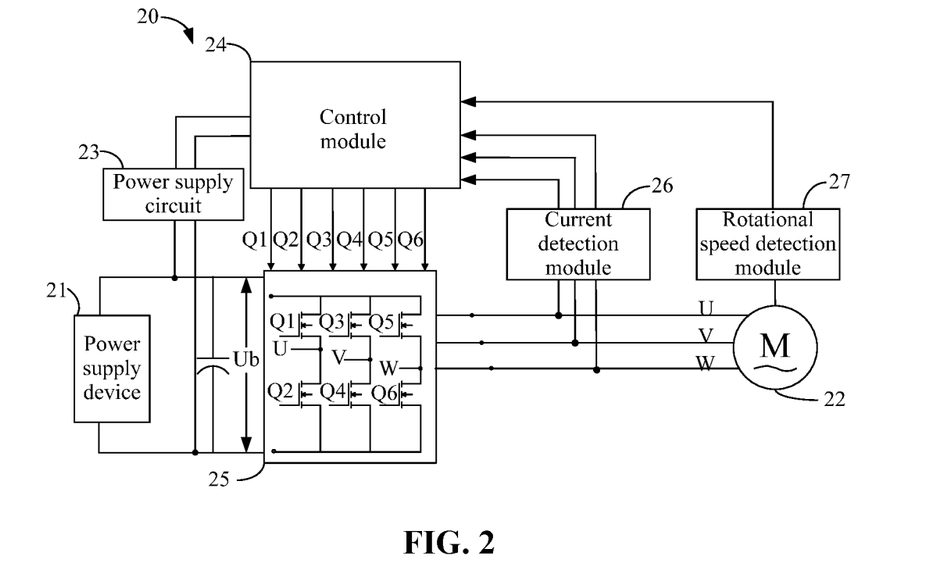
FIG. 2 is a block diagram of a circuit system of a power tool according to an example.

FIG. 2 shows a block diagram of a circuit system of a power tool as one of the examples. As shown in FIG. 2, a circuit system 20 of the power tool includes a power supply device 21, a motor 22, a power supply circuit 23, a control module 24, a driver circuit 25, a current detection module 26, and a rotational speed detection module 27.

The motor 22 includes a stator winding and a rotor. In some examples, the motor 22 is a three-phase motor and includes the rotor with a permanent magnet and three-phase stator windings U, V, and W that are commutated electronically. In some examples, the three-phase stator windings U, V, and W adopt a star connection. In some other examples, the three-phase stator windings U, V, and W adopt a delta connection. However, it must be understood that other types of motors are also within the scope of the present disclosure. The motor may include less than or more than three phases.

The power supply circuit 23 is used for supplying power to at least the control module 24. In some examples, the power supply circuit 23 is electrically connected to the power supply device 21 to convert electrical energy of the power supply device 21 into a power supply voltage adapted to the control module 24 and output the power supply voltage. For example, in some examples, the power supply circuit 23 reduces a voltage from the power supply device 21 to 15 V to supply power to the control module 24.

The driver circuit 25 is used for driving the motor 22 and electrically connected to the power supply device 21. An input terminal of the driver circuit 25 receives the voltage from the power supply device 21, and the driver circuit 25 is driven by drive signals outputted by the control module 24 to distribute the voltage to each phase winding on a stator of the motor 22 according to a certain logical relationship so that the motor 22 is started and generates continuous torque. Specifically, the driver circuit 25 includes multiple electronic switches. In some examples, the electronic switch includes a field-effect transistor (FET). In some other examples, the electronic switch includes an insulated-gate bipolar transistor (IGBT). In some examples, the driver circuit 25 is a three-phase bridge circuit. The driver circuit 25 includes three drive switches Q1, Q3, and Q5 provided as high-side switches and three drive switches Q2, Q4, and Q6 provided as low-side switches.

The three drive switches Q1, Q3, and Q5 as high-side switches are separately disposed between a power supply line and coils of phases of the motor 22. Three switching elements Q2, Q4, and Q6 as low-side switches are separately disposed between the coils of phases of the motor 22 and a ground line.

Gate terminals UH, UL, VH, VL, WH, and WL of the six drive switches Q1 to Q6 are electrically connected to the control module 24, and each drain or source of the drive switches is connected to the stator winding of the motor 22. The drive switches Q1 to Q6 are turned on or off at a certain frequency according to control signals outputted by the control module 24, thereby changing a power state of the power supply device 21 loaded on the winding of the motor 22.

The driver circuit 25 is used for driving the rotation of the motor 22 by switching an energized state of each phase winding of the motor 22 and controlling an energized current of each phase winding. The sequence in which phase windings are on and the time for which each phase winding is on depend on a position of the rotor. To rotate the motor 22, the driver circuit 25 has multiple driving states. In a driving state, the stator windings of the motor 22 may generate a magnetic field, and the control module 24 outputs control signals based on different positions of the rotor to control the driver circuit 25 to switch the driving states. Therefore, the magnetic field generated by the stator windings is rotated to drive the rotor to rotate, thereby driving the motor 22.

The current detection module 26 is connected to the motor 22 and used for collecting a current of the motor 22, where the current may be a bus current of the motor 22 or a phase current of each phase winding of the motor 22. As an example, the current detection module 26 detects the phase current of each phase winding of the motor 22, the bus current of the motor 22 may be calculated from the detected three-phase current values, and the current detection module 26 includes a Hall current sensor for directly detecting the phase current of each phase winding of the motor 22.

Figure 3:
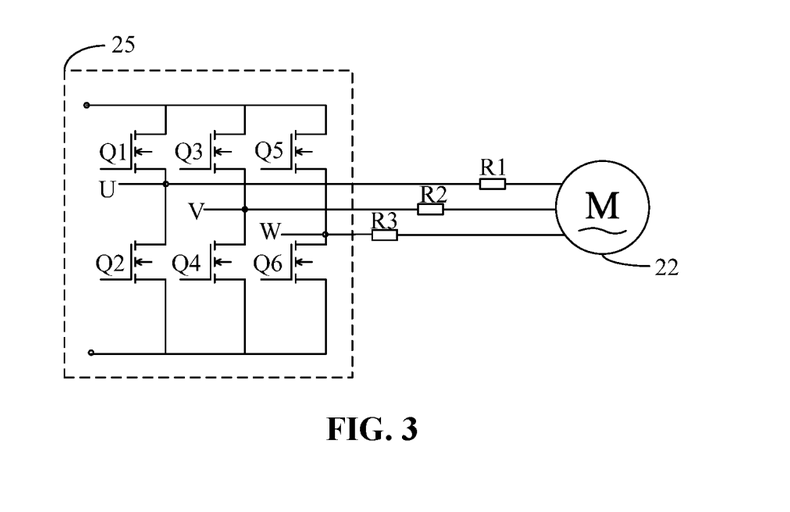
FIG. 3 is a schematic diagram illustrating the principle of the detection of a phase current by a current detection module according to an example.

Referring to FIG. 3, detection resistors R1, R2, and R3 are separately connected in series between the driver circuit 25 and the phase windings of the motor 22, and the current detection module 26 can calculate the phase current of each phase winding or the bus current by detecting voltages across the detection resistors. Specifically, the current detection module 26 can calculate phase currents of the three-phase stator windings U, V, and W by detecting the voltages across the detection resistors R1, R2, and R3, respectively.

Figure 4:
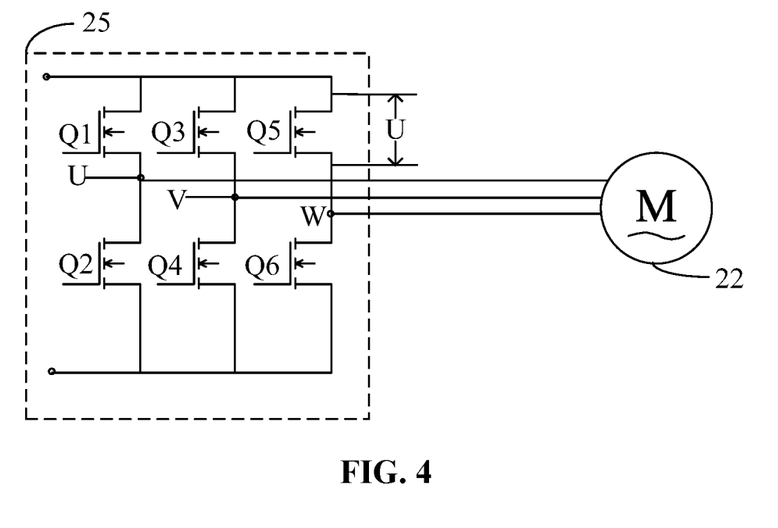
FIG. 4 is a schematic diagram illustrating the principle of the detection of a phase current by a current detection module according to another example.

Referring to FIG. 4, the current detection module 26 is used for detecting internal resistance of an electronic switch in an on state in the driver circuit 25 and calculating a current flowing through the electronic switch based on the internal resistance of the electronic switch in the on state and a voltage value across the electronic switch, where the current of the electronic switch is a phase current of the corresponding winding of the motor 22. Specifically, the current detection module 26 separately detects a voltage across each of the three drive switches Q1, Q3, and Q5 as the high-side switches and calculates the phase currents of the corresponding three-phase stator windings U, V, and W. In this manner, the power tool can detect the phase currents of the corresponding windings of the motor 22 without additional hardware, thereby saving a cost.

The rotational speed detection module 27 is used for acquiring at least one of a measured rotational speed of the motor 22 and the position of the rotor. In some examples, the rotational speed detection module 27 includes a sensor that can directly detect the speed and position of the motor 22, such as a Hall sensor. In some other examples, the rotational speed detection module 27 is configured to estimate the position of the rotor of the motor 22 according to at least phase voltages of the motor 22 and current values of the stator windings. For example, inductance values of the stator windings are estimated according to the phase voltages of the motor 22 and the currents of the stator windings, and a one-to-one matching relationship is established between the inductance values and positions of the rotor (by a table lookup method, a formula modeling method, or the like), thereby acquiring the position of the rotor. The rotational speed is then calculated according to a change of the position of the rotor.

The control module 24 is connected to the driver circuit 25 and configured to control switching operations of the multiple electronic switches of the driver circuit 25 at a preset frequency to adjust the current loaded to the winding to rotate the motor 22 at a preset rotational speed, where the preset frequency ranges from 5 kHz to 40 kHz. Optionally, the preset frequency ranges from 5 kHz to 20 kHz. In some examples, a PWM signal having the preset frequency is outputted according to at least one of the phase currents of the windings, the measured rotational speed of the motor 22, and the position of the rotor, so as to control the switching operations of the multiple electronic switches.

Figure 5:
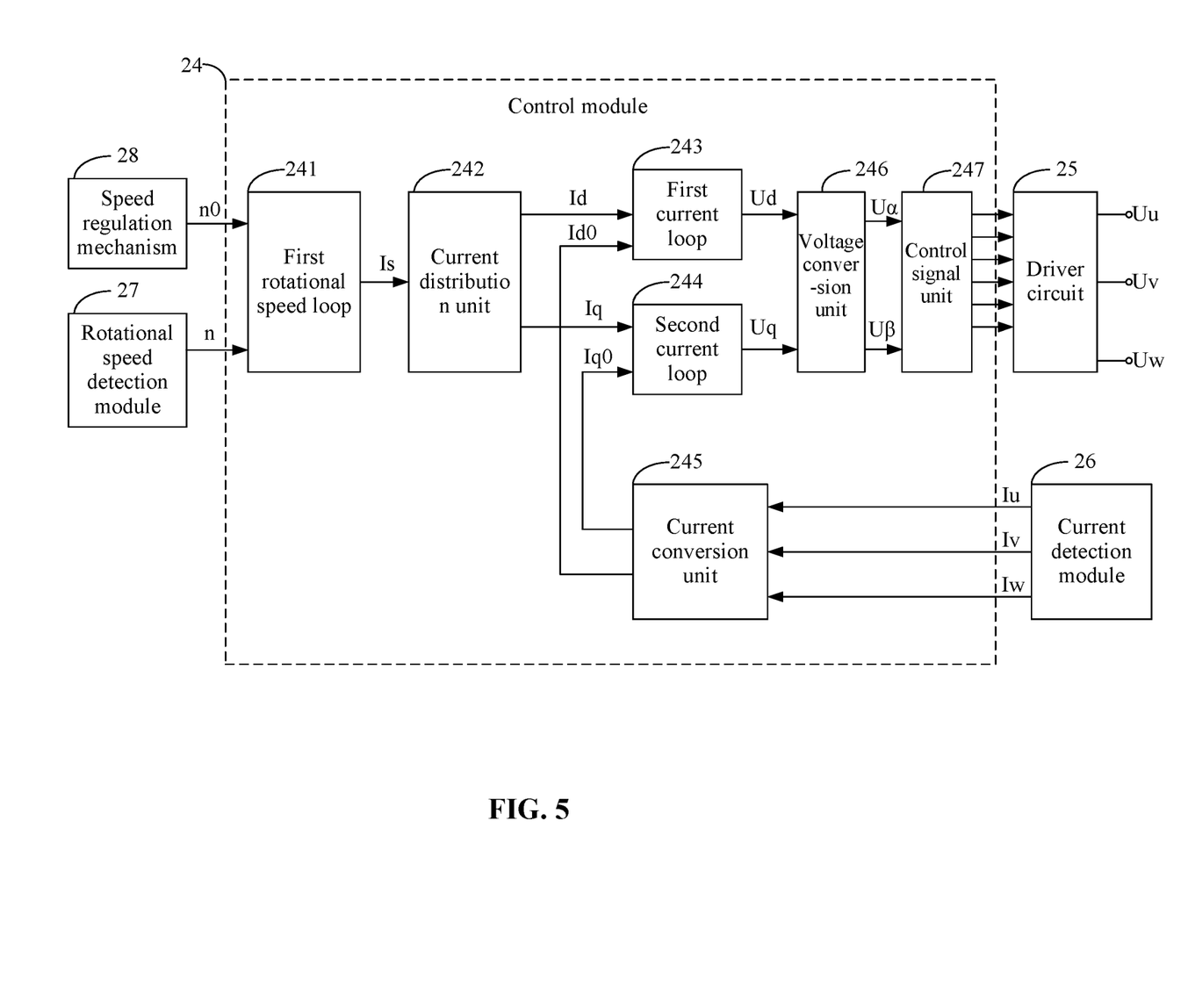
FIG. 5 is a block diagram of a control module in FIG. 2 as a first example.

Referring to FIG. 5, as one of the examples, the control module 24 specifically includes a first rotational speed loop 241, a current distribution unit 242, a first current loop 243, a second current loop 244, a current conversion unit 245, a voltage conversion unit 246, and a control signal unit 247.

A speed regulation mechanism 28 may be the trigger structure as shown in FIG. 1 and is used for the user to set a target rotational speed n0 of the motor 22.

The first rotational speed loop 241 is connected to the speed regulation mechanism 28 and the rotational speed detection module 27 and acquires the target rotational speed n0 of the motor 22 set by the user and from the speed regulation mechanism and an actual rotational speed n of the motor 22 detected by the rotational speed detection module 27. The first rotational speed loop 241 is used for generating a target current Is of the motor 22 according to the target rotational speed of the motor 22 and the actual rotational speed of the motor 22.

The current distribution unit 242 is connected to the first rotational speed loop 241 and used for distributing a direct-axis target current Id and a quadrature-axis target current Iq according to the target current Is. The target current Is, the direct-axis target current Id, and the quadrature-axis target current Iq are vectors having directions and magnitudes, where the directions of the direct-axis target current Id and the quadrature-axis target current Iq are perpendicular to each other, and the target current Is is a resultant vector of the direct-axis target current Id and the quadrature-axis target current Iq.

The current conversion unit 245 is connected to the current detection module 26 and used for acquiring currents Iu, Iv, and Iw of the three-phase windings. The current detection module 26 transmits the detected three-phase currents Iu, Iv, and Iw in the actual operation of the motor 22 to the current conversion unit 245 in the control module 24. The current conversion unit 245 converts the three-phase currents Iu, Iv, and Iw into two-phase currents, which are separately a direct-axis actual current Id0 and a quadrature-axis actual current Iq0.

The first current loop 243 is connected to the current distribution unit 242 and the current conversion unit 245, acquires a first distributed current Id and a first actual current Id0, and generates a first regulation voltage Ud according to the first distributed current Id and the first actual current Id0.

The second current loop 244 is connected to the current distribution unit 242 and the current conversion unit 245, acquires a second distributed current Iq and a second actual current Iq0, and generates a second regulation voltage Uq according to the second distributed current Iq and the second actual current Iq0.

The voltage conversion unit 246 is connected to the first current loop 243 and the second current loop 244, acquires the first regulation voltage Ud and the second regulation voltage Uq, converts the first regulation voltage Ud and the second regulation voltage Uq into a first voltage control quantity Uα and a second voltage control quantity Uβ as intermediate quantities related to three-phase voltages Uu, Uv, and Uw loaded to the motor 22, and outputs the first voltage control quantity Uα and the second voltage control quantity Uβ to the control signal unit 247. According to the first voltage control quantity Uα and the second voltage control quantity Uβ as the intermediate quantities, the control signal unit 247 generates the control signals for controlling the switching operations of the multiple electronic switches in the driver circuit 25 so that the three-phase voltages Uu, Uv, and Uw are loaded to the windings of the motor 22, and the currents loaded to the windings are adjusted within multiple successive full cycles of a voltage waveform of the power supply, thereby rotating the motor 22 at the preset rotational speed. Uu, Uv, and Uw are three-phase symmetrical sine wave voltages or saddle wave voltages, and the three-phase voltages Uu, Uv, and Uw have a phase difference of 120° with each other.

That is to say, in this example, the current distribution unit 242 is used for distributing the direct-axis target current Id and the quadrature-axis target current Iq according to the target current Is of the motor 22 generated by the first rotational speed loop 241. The current conversion unit 245 is used for generating the direct-axis actual current Id0 and the quadrature-axis actual current Iq0 according to the actual currents of the motor 22. The first current loop 243 generates the first regulation voltage Ud according to the direct-axis target current Id and the direct-axis actual current Id0. The second current loop 244 generates the second regulation voltage Uq according to the quadrature-axis target current Iq and the quadrature-axis actual current Iq0. The voltage conversion unit 246 generates the first voltage control quantity Uα and the second voltage control quantity Uβ according to the first regulation voltage Ud and the second regulation voltage Uq. According to the first voltage control quantity Uα and the second voltage control quantity Uβ, the control signal unit 247 generates the control signals for controlling the multiple electronic switches in the driver circuit 25 to be turned on or off at the preset frequency so that the three-phase voltages Uu, Uv, and Uw are loaded to the windings of the motor 22, and the currents loaded to the windings are adjusted, thereby rotating the motor 22 at the preset rotational speed. The preset frequency ranges from 5 kHz to 40 kHz. Optionally, the preset frequency ranges from 5 kHz to 20 kHz. In some examples, the control signal is the PWM signal having the preset frequency, where a duty cycle of the PWM signal is set according to the target rotational speed of the motor 22. The preset frequency ranges from 5 kHz to 40 kHz. Optionally, the preset frequency ranges from 5 kHz to 20 kHz.

Figure 6A:
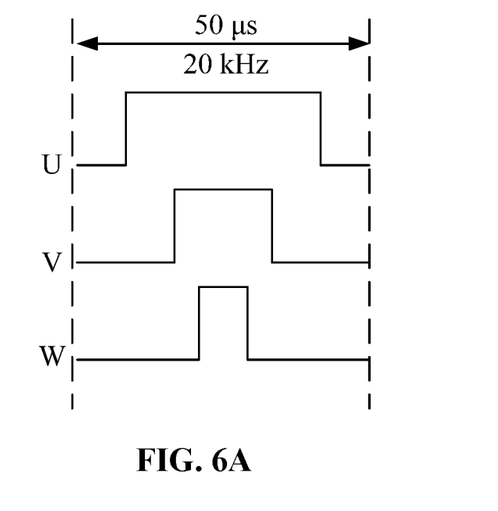
FIG. 6A shows a seven-segment PWM signal wave.
Figure 6B:
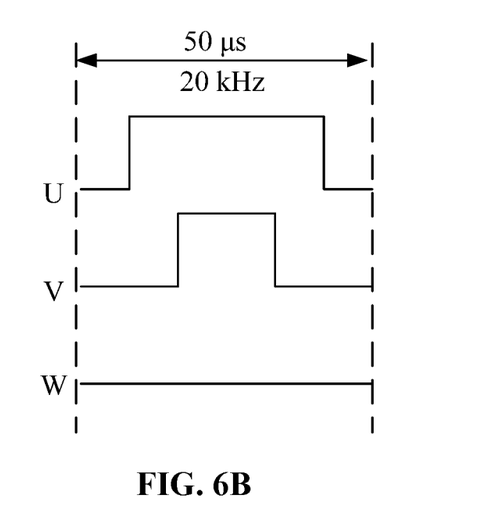
FIG. 6B shows a discontinuous PWM signal wave.

In some examples, the PWM signal is a seven-segment PWM signal. A PWM signal having a frequency of 20 kHz and a cycle of 50 μs is used as an example. FIG. 6A shows a seven-segment PWM signal wave. In some other examples, the PWM signal is a discontinuous PWM signal. FIG. 6B shows a discontinuous PWM signal wave. As shown in the figures, a switching function of at least one phase remains at a low level in each cycle, that is, the electronic switch of at least one phase remains closed, thereby reducing the frequency at which the electronic switch in the driver circuit 25 is turned on. Therefore, the electronic switch has a low loss and generates a small amount of heat.

Figure 7:
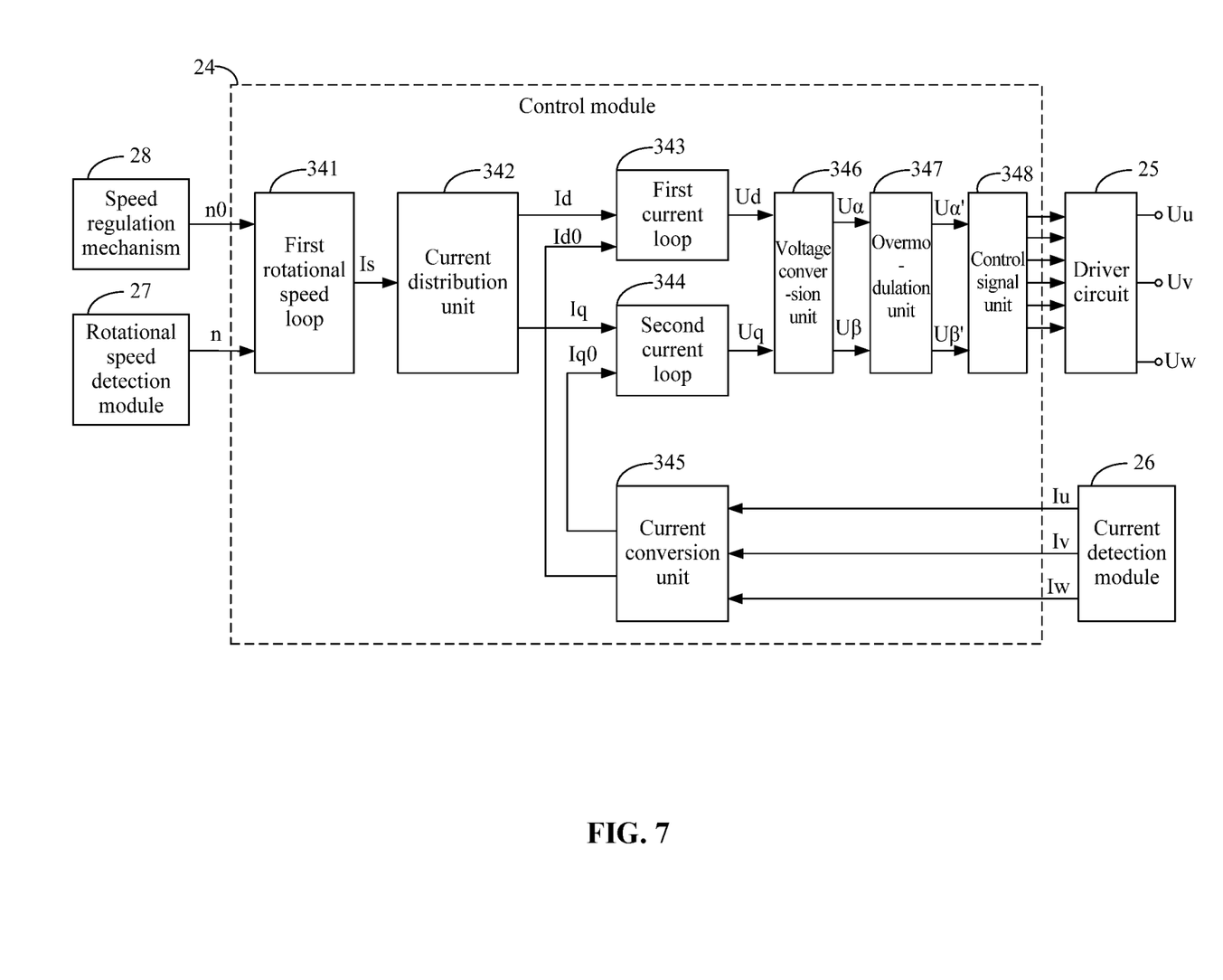
FIG. 7 is a block diagram of a control module in FIG. 2 as a second example.

FIG. 7 shows the control module 24 as another example. The control module 24 is configured to calculate a voltage vector according to the measured rotational speed of the motor 22, the phase current of the winding, and the target rotational speed and overmodulate the voltage vector to obtain a modulated voltage vector to output the PWM signal to the driver circuit 25. A per-unit value of an amplitude $|\vec{U}|$ of an overmodulated voltage vector is a ratio of an amplitude $|\vec{U}|$ of the voltage vector to 0.5 times an amplitude |Ub| of a bus voltage.

This is, $$p \cdot u = \frac{|\vec{U}|}{0.5|Ub|},$$

where the per-unit value p.u ranges from 0 to 1.15.

Unlike the control module 24 in the example shown in FIG. 5, the control module 24 shown in FIG. 7 further includes an overmodulation unit 347. The control module 24 includes a first rotational speed loop 341, a current distribution unit 342, a first current loop 343, a second current loop 344, a current conversion unit 345, a voltage conversion unit 346, the overmodulation unit 347, and a control signal unit 348.

The first rotational speed loop 341 is connected to the speed regulation mechanism 28 and the rotational speed detection module 27 and acquires the target rotational speed n0 of the motor 22 set by the user and from the speed regulation mechanism and the actual rotational speed n of the motor 22 detected by the rotational speed detection module 27. The first rotational speed loop 341 is used for generating the target current Is of the motor 22 according to the target rotational speed of the motor 22 and the actual rotational speed of the motor 22.

The current distribution unit 342 is connected to the first rotational speed loop 341 and used for distributing the direct-axis target current Id and the quadrature-axis target current Iq according to the target current Is. The target current Is, the direct-axis target current Id, and the quadrature-axis target current Iq are the vectors having directions and magnitudes, where the directions of the direct-axis target current Id and the quadrature-axis target current Iq are perpendicular to each other, and the target current Is is the resultant vector of the direct-axis target current Id and the quadrature-axis target current Iq.

The current conversion unit 345 is connected to the current detection module 26 and used for acquiring the currents Iu, Iv, and Iw of the three-phase windings. The current detection module 26 transmits the detected three-phase currents Iu, Iv, and Iw in the actual operation of the motor 22 to the current conversion unit 345 in the control module 24. The current conversion unit 345 converts the three-phase currents Iu, Iv, and Iw into two-phase currents, which are separately the direct-axis actual current Id0 and the quadrature-axis actual current Iq0.

The first current loop 343 is connected to the current distribution unit 342 and the current conversion unit 345, acquires the direct-axis target current Id and the direct-axis actual current Id0, and generates the first regulation voltage Ud according to the direct-axis target current Id and the direct-axis actual current Id0.

The second current loop 344 is connected to the current distribution unit 342 and the current conversion unit 345, acquires the quadrature-axis target current Iq and the quadrature-axis actual current Iq0, and generates the second regulation voltage Uq according to the quadrature-axis target current Iq and the quadrature-axis actual current Iq0.

The voltage conversion unit 346 is connected to the first current loop 343 and the second current loop 344, acquires the first regulation voltage Ud and the second regulation voltage Uq, converts the first regulation voltage Ud and the second regulation voltage Uq into the first voltage control quantity Uα and the second voltage control quantity Uβ as the intermediate quantities related to the three-phase voltages Uu, Uv, and Uw loaded to the motor 22, and outputs the first voltage control quantity Uα and the second voltage control quantity Uβ to the overmodulation unit 347. The overmodulation unit 347 overmodulates the voltage vector according to the first voltage control quantity Uα and the second voltage control quantity Uβ as the intermediate quantities to output a first overmodulated voltage Uα' and a second overmodulated voltage Uβ'. According to the first overmodulated voltage Uα' and the second overmodulated voltage Uβ', the control signal unit 348 generates the control signals for controlling the switching operations of the multiple electronic switches in the driver circuit 25 so that the three-phase voltages Uu, Uv, and Uw are loaded to the windings of the motor 22. A per-unit value of an amplitude $|\vec{U}|$ of a voltage space vector formed by the first overmodulated voltage Uα' and the second overmodulated voltage Uβ' ranges from 0 to 1.15.

Figure 8:
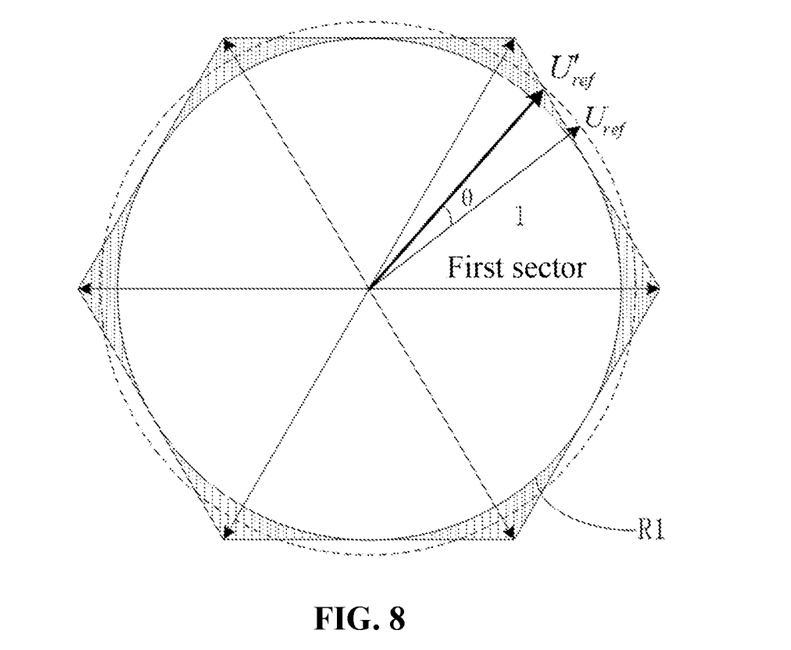
FIG. 8 is a diagram of a voltage vector of a phase voltage of a motor.

When the motor 22 adopts the modulation manner of a control system of the control module 24 shown in FIG. 5, the trajectory of a limit voltage space vector that can be outputted is a regular hexagon. With reference to FIG. 8, an inscribed circle region R1 of the regular hexagon is a linear modulation region. To make the voltage vector approach a hexagonal mode at infinity to improve voltage utilization, the voltage space vector is overmodulated. A shaded region of the regular hexagon outside the inscribed circle R1 in the figure is an overmodulation region. Therefore, when the voltage space vector falls outside the regular hexagon, the voltage space vector is pulled inside the regular hexagon following the principle of a constant amplitude and a compensated angle. When an amplitude of the voltage space vector exceeds a vertex magnitude of the regular hexagon, a corresponding vertex voltage space vector is selected as a reference voltage vector according to a sector where the voltage space vector is located. A first sector is used as an example. The overmodulation unit may calculate a compensation space vector angle θ corresponding to a second voltage space vector $U_{ref}'$ according to a first voltage space vector $U_{ref}$ to obtain the vector of the first overmodulated voltage Uα' and the second overmodulated voltage Uβ'. According to the vector of the first overmodulated voltage Uα' and the second overmodulated voltage Uβ', the control signal unit calculates switching times of the multiple electronic switches in the driver circuit 25 and outputs the corresponding control signals so that the three-phase voltages Uu, Uv, and Uw are loaded to the windings of the motor 22, thereby rotating the motor 22 at the preset rotational speed. A per-unit value of an amplitude $|\vec{U_{ref}'}|$ of the second voltage space vector $U_{ref}'$ ranges from 1 to 1.15.

When the first voltage space vector $U_{ref}$ is within the inscribed circle, the overmodulation does not need to be performed on the first voltage space vector $U_{ref}$, and a per-unit value of an amplitude $|\vec{U_{ref}}|$ of the first voltage space vector $U_{ref}$ ranges from 0 to 1. The overmodulation unit receives the first voltage control quantity Uα and the second voltage control quantity Uβ as the intermediate quantities and outputs the first overmodulated voltage Uα' and the second overmodulated voltage Uβ'. The first overmodulated voltage Uα' is the same as the first voltage control quantity Uα, and the second overmodulated voltage Uβ' is the same as the second voltage control quantity Uβ. According to the first overmodulated voltage Uα', that is, the first voltage control quantity Uα, and the second overmodulated voltage Uβ', that is, the second voltage control quantity Uβ, the control signal unit 348 generates the control signals for controlling the switching operations of the multiple electronic switches in the driver circuit 25 so that the three-phase voltages Uu, Uv, and Uw are loaded to the windings of the motor 22.

Figure 9A:
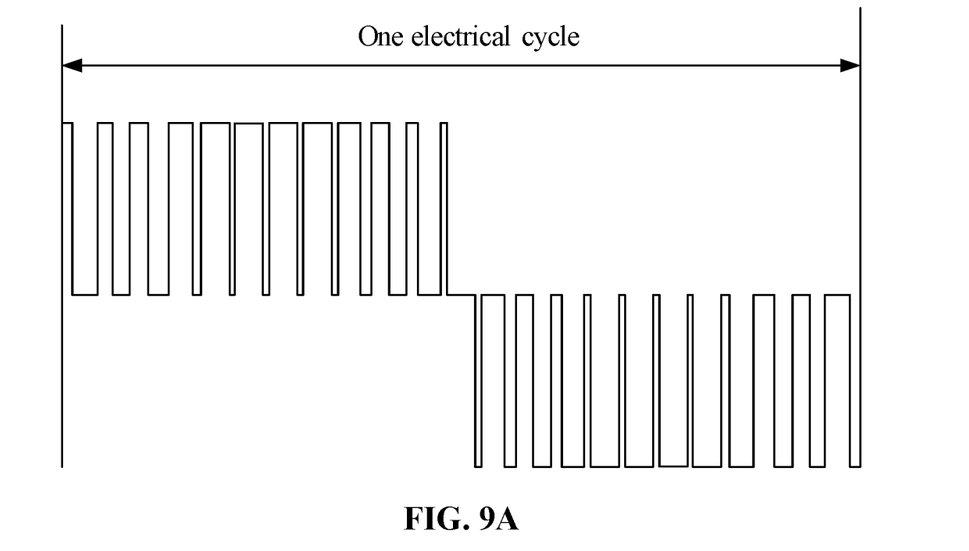
FIG. 9A shows a phase voltage curve of a phase winding of a motor adopting the control module in the example shown in FIG. 5 in one electrical cycle.
Figure 9B:
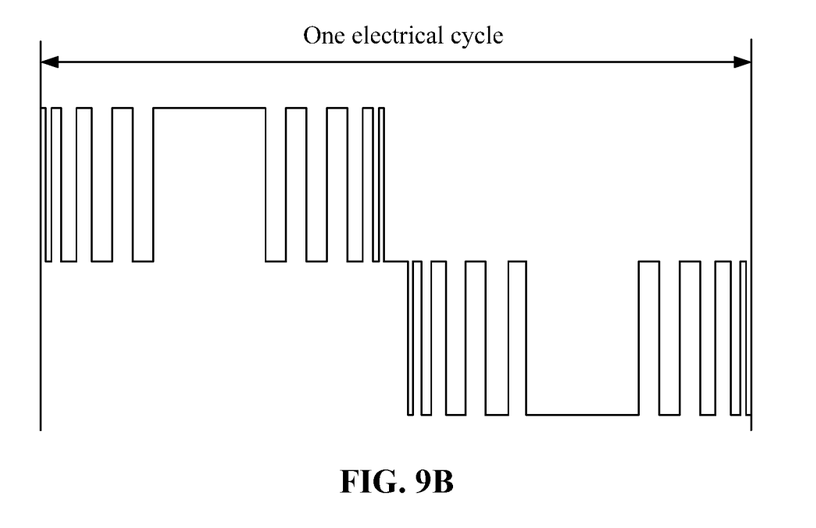
FIG. 9B shows a phase voltage curve of a phase winding of a motor adopting the control module in the example shown in FIG. 7 in one electrical cycle.

FIG. 9A shows a phase voltage curve of a phase winding of the motor 22 adopting the control module 24 in the example shown in FIG. 5 in one electrical cycle; and FIG. 9B shows a phase voltage curve of a phase winding of the motor 22 adopting the control module 24 in the example shown in FIG. 7 in one electrical cycle. As shown in the figures, after the voltage vector is overmodulated, the phase voltage of the motor 22 is maintained at a constant value for a preset time in one electrical cycle. That is, the control module 24 is configured to calculate the voltage vector according to the measured rotational speed of the motor 22, the phase current of the winding, and the target rotational speed and overmodulate the voltage vector to output the PWM signal to the driver circuit 25 to maintain the phase voltage of the motor 22 at the constant value for the preset time in one electrical cycle.

Figure 10A:
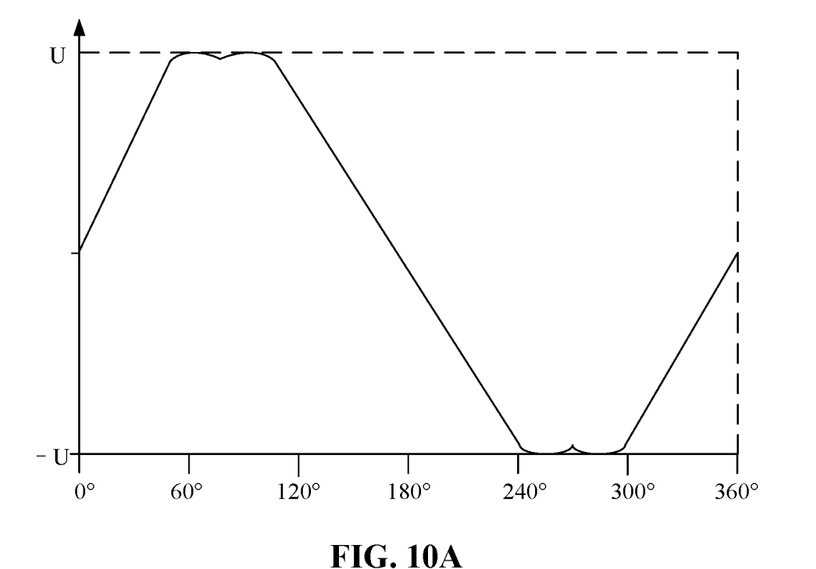
FIG. 10A is a voltage waveform graph of a filtered terminal voltage across a phase of stator winding of a motor in one electrical cycle as an example.
Figure 10B:
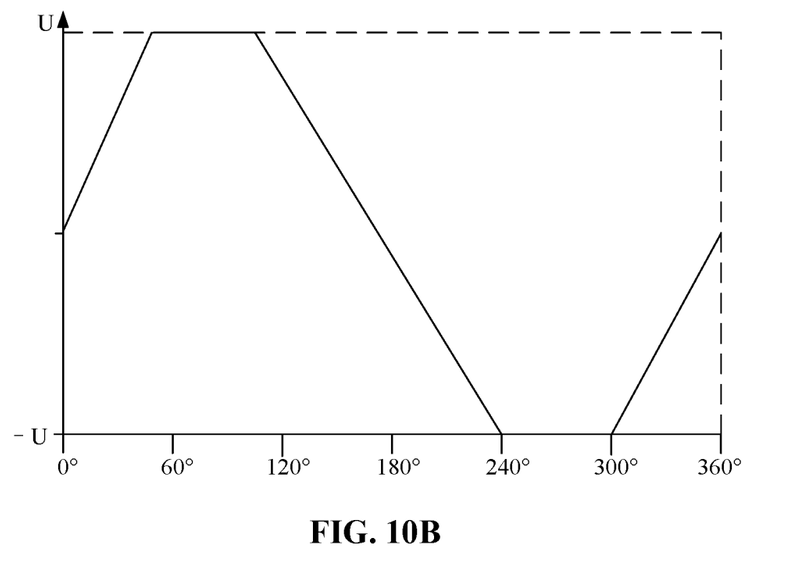
FIG. 10B is a voltage waveform graph of a filtered terminal voltage across a phase of stator winding of a motor in one electrical cycle as another example.

In this manner, the control module 24 is configured to generate the voltage vector according to the measured rotational speed n of the motor, the phase current of the winding, and the target rotational speed n0 and overmodulate the voltage vector to output the PWM signal to the driver circuit 25 so that a voltage waveform of a filtered terminal voltage of the motor includes at least two peaks in one cycle. FIG. 10 shows a voltage waveform graph of a filtered terminal voltage across a phase of stator winding of the motor in one cycle, where the voltage waveform includes at least two peaks in one cycle. It is to be noted that including at least two peaks in one cycle means that the corresponding voltage waveform includes two peaks (FIG. 10A) or a smooth curve segment (FIG. 10B). Therefore, the voltage utilization is improved, thereby increasing the rotational speed and output power of the motor.

Figure 11:
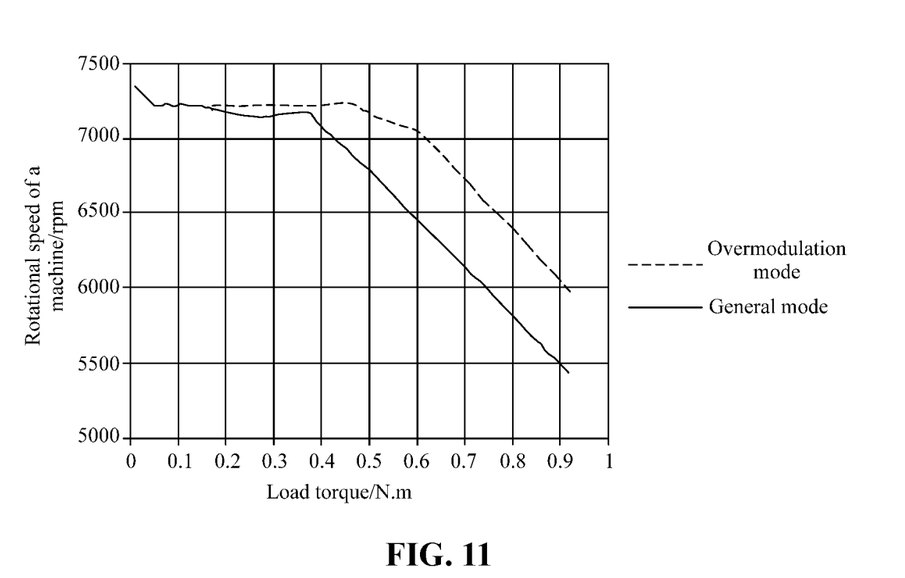
FIG. 11 is a graph of relationship curves between a rotational speed and torque of a motor of a power tool.

FIG. 11 shows relationship curves between the rotational speed of the motor 22 and the torque of the motor 22. A horizontal axis represents output torque of the motor 22 in N·m, a vertical axis represents the rotational speed n of the motor 22 in rpm, a dotted line represents an effect curve illustrating that the rotational speed of the motor 22 varies with the torque of the motor 22 using an overmodulation control manner, and a solid line represents an effect curve illustrating that the rotational speed of the motor 22 varies with the torque of the motor 22 using the control manner in the example shown in FIG. 5. As can be seen from FIG. 9, compared with the control manner in the example shown in FIG. 5, the overmodulation control manner has the advantage of a wide constant-speed range so that some power tools working with light or moderate loads, such as the electric drill and an electric screwdriver, have the characteristic of a relatively wide constant-speed range and can obtain a better and more consistent working effect. In addition, the overmodulation control manner is adopted so that the rotational speed of the motor 22 is higher when the motor 22 outputs the same torque. For the power tool, a higher rotational speed means higher working efficiency.

Figure 12:
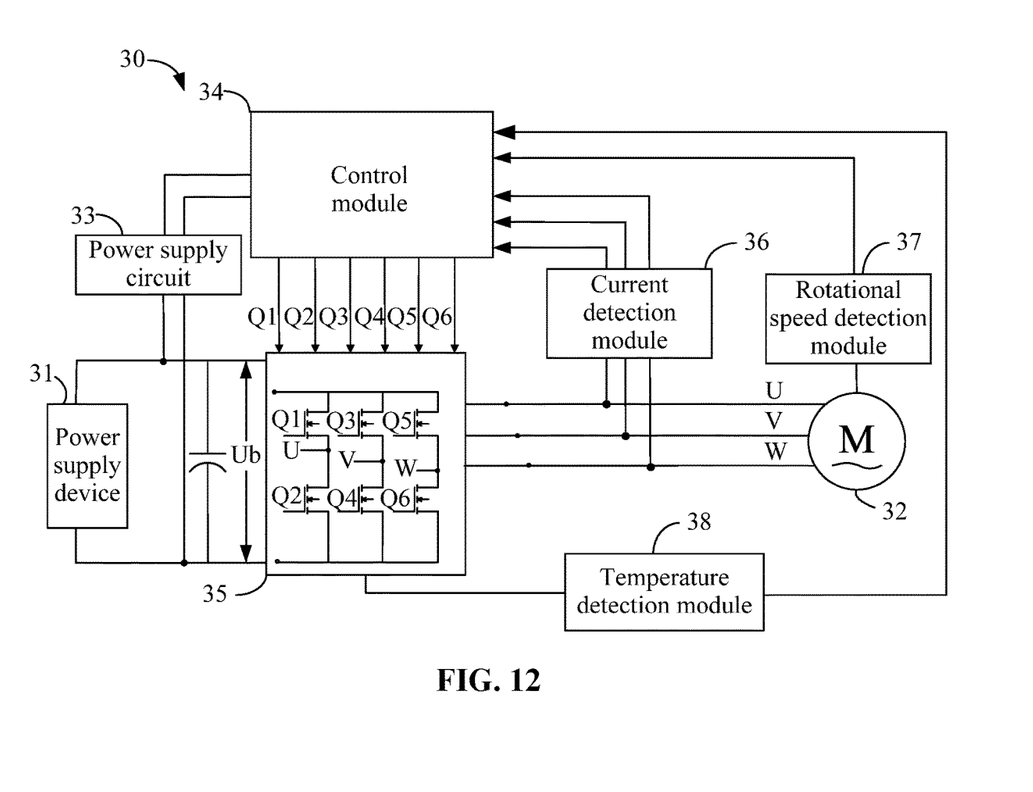
FIG. 12 is a block diagram of a circuit system of a power tool according to an example.

In the working process of some cutting tools, for example, when the circular saw performs cutting under a light load, the cutting capability under the light load is still insufficient. To solve this problem, the working efficiency of the tool in a light-load stage is improved. FIG. 12 shows a block diagram of a circuit system of the power tool as an example. As shown in FIG. 12, a circuit system 30 of the power tool includes a power supply device 31, a motor 32, a power supply circuit 33, a control module 34, a driver circuit 35, a current detection module 36, a rotational speed detection module 37, and a temperature detection module 38. In this example, for modules or circuits or devices other than the temperature detection module 38, reference may be made to the description in the preceding examples. The details are not repeated here.

In this example, the motor 32 has not been started when the temperature detection module 38 performs temperature acquisition. The temperature detection module 38 may be a temperature acquisition sensor, a thermistor, or any other device capable of detecting a temperature. Optionally, the temperature detection module 38 may detect a temperature at any position of the power tool, such as a temperature inside the tool, a temperature of the circuit board within the tool, or a temperature of a related element on the circuit board. Optionally, as shown in FIG. 12, the temperature detection module 38 is used for detecting a temperature of each electronic switch in the driver circuit 35. Further, the control module 34 may acquire the temperature detected by the temperature detection module 38 and, when the temperature is less than a first temperature threshold, overmodulate the voltage vector to obtain the modulated voltage vector to output a first PWM signal to the driver circuit 35 so that the driver circuit 35 drives the motor 32 to start at a first rotational speed. That is to say, in this example, before the motor 32 starts, a light-load or no-load starting rotational speed of the motor 32 may be controlled in an overmodulation mode according to the temperature of the electronic switch in the driver circuit 35, thereby achieving relatively high light-load working efficiency.

In an example, if the temperature detected by the temperature detection module 38 is greater than a second temperature threshold, the control module 34 may perform common modulation on the voltage vector to obtain the modulated voltage vector to output a second PWM signal to the driver circuit 35 so that the driver circuit 35 drives the motor 32 to start at a second rotational speed. It is to be understood that the first temperature threshold is less than the second temperature threshold and the first rotational speed is greater than the second rotational speed. That is to say, if the temperature of the electronic switch is relatively low before the motor 32 starts, the motor 32 starts at a high rotational speed and with a light load by using the overmodulation mode; and if the temperature of the electronic switch is relatively high before the motor 32 starts, the motor starts at a slightly lower rotational speed and with a light load by using a common modulation mode.

What is claimed is:
1. A power tool, comprising:
a motor comprising a stator winding and a rotor rotating around a stator;
a speed regulation mechanism at least used for setting a target rotational speed of the motor;
a driver circuit for delivering electrical energy provided by a power supply device from a direct current bus to the motor, wherein the driver circuit comprises a plurality of electronic switches connected between the power supply device and the motor; and
a control module;
wherein the control module is configured to calculate a voltage vector according to a measured rotational speed of the motor, a phase current of the stator winding, and the target rotational speed and overmodulate the voltage vector to obtain a modulated voltage vector to output a pulse-width modulation (PWM) signal to the driver circuit and a per-unit value of an amplitude of the modulated voltage vector ranges from 0 to 1.15, wherein the control module comprises a first rotational speed loop for generating a target current of the motor according to the target rotational speed of the motor and an actual rotational speed of the motor, wherein the control module comprises:
- a current distribution unit for distributing a direct-axis target current and a quadrature-axis target current according to the target current of the motor generated by the first rotational speed loop;
- a current conversion unit for generating a direct-axis actual current and a quadrature-axis actual current according to an actual current of the motor;
- a first current loop for generating a first regulation voltage according to the direct-axis target current and the direct-axis actual current;
- a second current loop for generating a second regulation voltage according to the quadrature-axis target current and the quadrature-axis actual current;
- a voltage conversion unit for generating a first voltage control quantity and a second voltage control quantity according to the first regulation voltage and the second regulation voltage;
- an overmodulation unit configured to perform overmodulation according to the first voltage control quantity and the second voltage control quantity to output a first overmodulated voltage and a second overmodulated voltage; and
- a control signal unit for generating control signals according to the first overmodulated voltage and the second overmodulated voltage, and wherein the control signals are used for controlling switching operations of the plurality of electronic switches of the driver circuit.

2. The power tool of claim 1, wherein the control module is configured to overmodulate part of the voltage vector exceeding a linear modulation region to obtain the modulated voltage vector to output the PWM signal to the driver circuit, and the per-unit value of the amplitude of the modulated voltage vector ranges from 1 to 1.15.

3. The power tool of claim 1, further comprising:
- a rotational speed detection module for detecting at least one of the measured rotational speed of the motor or a position of the rotor; and
- a current detection module for detecting the phase current of each phase of the stator winding.

4. The power tool of claim 3, wherein the current detection module is configured to acquire internal resistance of an electronic switch turned on and calculate a bus current or the phase current according to the internal resistance of the electronic switch and a voltage value across the electronic switch.

5. The power tool of claim 3, further comprising a detection resistor connected in series between the driver circuit and the stator winding; wherein the current detection module is configured to calculate a bus current or the phase current according to a voltage across the detection resistor.

6. The power tool of claim 1, wherein the motor is a three-phase motor, and three-phase input voltages of the motor are at a phase angle of 120° to each other.

7. The power tool of claim 1, wherein the PWM signal is a discontinuous PWM signal.

8. The power tool of claim 1, further comprising a temperature detection module for detecting a temperature of the power tool before the motor is started and wherein the control module is configured to overmodulate the voltage vector to obtain the modulated voltage vector to output a first PWM signal to the driver circuit so that the driver circuit drives the motor to start when the temperature is lower than a first temperature threshold.

9. The power tool of claim 8, wherein the control module is configured to perform common modulation on the voltage vector to obtain the modulated voltage vector to output a second PWM signal to the driver circuit so that the driver circuit drives the motor to start when the temperature is higher than a second temperature threshold.

10. The power tool of claim 9, wherein the first temperature threshold is less than the second temperature threshold.

11. The power tool of claim 1, wherein the control module is configured to control switching operations of the plurality of electronic switches at a preset frequency, and the preset frequency ranges from 5 kHz to 40 kHz.

12. The power tool of claim 1, wherein a voltage waveform of a filtered terminal voltage of the motor comprises at least two peaks in one cycle.

13. A power tool, comprising:
- a motor comprising a stator winding and a rotor rotating around a stator;
- a speed regulation mechanism at least used for setting a target rotational speed of the motor;
- a driver circuit comprising a plurality of electronic switches connected between a power supply device and the motor; and
- a control module;
wherein the control module is configured to calculate a voltage vector according to a measured rotational speed of the motor, a phase current of the stator winding, and the target rotational speed and overmodulate the voltage vector to output a pulse-width modulation (PWM) signal to the driver circuit to maintain a phase voltage of the motor at a constant value for a preset time in one electrical cycle,
further comprising a temperature detection module for detecting a temperature of the power tool before the motor is started and wherein the control module is configured to overmodulate the voltage vector to obtain a modulation of the voltage vector to output a first PWM signal to the driver circuit so that the driver circuit drives the motor to start when the temperature is lower than a first temperature threshold.

* * * * *